United States Patent
Yang

(10) Patent No.: US 11,546,237 B2
(45) Date of Patent: Jan. 3, 2023

(54) MULTI-ACCESS EDGE COMPUTING ARCHITECTURE AND DETECTION METHOD THEREOF

(71) Applicant: ARCADYAN TECHNOLOGY CORPORATION, Hsinchu (TW)

(72) Inventor: Yu-Shuang Yang, Hsinchu (TW)

(73) Assignee: ARCADYAN TECHNOLOGY CORPORATION, Hsinchu (TW)

(*) Notice: Subject to any disclaimer, the term of this patent is extended or adjusted under 35 U.S.C. 154(b) by 3 days.

(21) Appl. No.: 17/467,324

(22) Filed: Sep. 6, 2021

(65) Prior Publication Data

US 2022/0255825 A1 Aug. 11, 2022

(30) Foreign Application Priority Data

Feb. 8, 2021 (TW) ................................. 110104838

(51) Int. Cl.
*H04L 12/26* (2006.01)
*H04L 43/0823* (2022.01)
*H04L 41/0654* (2022.01)
*H04W 24/04* (2009.01)
*H04L 43/0817* (2022.01)
*H04L 41/40* (2022.01)
(Continued)

(52) U.S. Cl.
CPC .......... *H04L 43/0823* (2013.01); *H04L 41/04* (2013.01); *H04L 41/0654* (2013.01); *H04L 41/0659* (2013.01); *H04L 41/40* (2022.05); *H04L 43/0817* (2013.01); *H04L 43/0847* (2013.01); *H04L 43/20* (2022.05); *H04W 24/04* (2013.01)

(58) Field of Classification Search
CPC ............ H04L 43/0823; H04L 43/0817; H04L 43/0847; H04L 43/20; H04L 41/0654; H04L 41/0659; H04L 41/40; H04L 41/04; H04W 24/04
See application file for complete search history.

(56) References Cited

U.S. PATENT DOCUMENTS

2012/0036567 A1* 2/2012 Senese .................. H04L 9/0838
726/7
2015/0139085 A1* 5/2015 Kaczmarska-Wojtania .................
H04W 8/20
370/329

(Continued)

*Primary Examiner* — Richard G Keehn
(74) *Attorney, Agent, or Firm* — Lin & Associates Intellectual Property, Inc.

(57) ABSTRACT

The present invention relates to a detection method for a multi-access edge computing architecture. The multi-access edge computing architecture uses the technology of bump-in-the-wire (BITW) to be deployed between the user device and the core network. The multi-access edge computing architecture includes a baseboard management controller, an edge computing service module, a central processing unit module, and a switching module. When any function in the multi-access edge computing architecture fails, the detection method of the present invention is used to actively detect and directly connect the base station to the core network. When the function is restored, the detection method of the present invention can actively restore the original path of the base station and the core network connected to the multi-access edge computing architecture to achieve seamless debugging and other purposes.

10 Claims, 7 Drawing Sheets

(51) Int. Cl.
*H04L 41/0659* (2022.01)
*H04L 41/04* (2022.01)
*H04L 43/20* (2022.01)

(56) References Cited

U.S. PATENT DOCUMENTS

| | | | |
|---|---|---|---|
| 2021/0377727 A1* | 12/2021 | Kanagasabai | H04W 12/041 |
| 2022/0200910 A1* | 6/2022 | Baldi | H04L 47/20 |
| 2022/0303246 A1* | 9/2022 | Miriyala | H04L 41/40 |

* cited by examiner

MULTI-ACCESS EDGE COMPUTING ARCHITECTURE AND DETECTION METHOD THEREOF

CROSS-REFERENCE TO RELATED APPLICATION

This application claims the priority of Taiwanese patent application No. 110104838, filed on Feb. 8, 2021, which is incorporated herewith by reference.

BACKGROUND OF THE INVENTION

1. Field of the Invention

The present invention relates generally to a detection method of a multi-access edge computing architecture, and more particularly, to a high-stability multi-access edge computing architecture with seamless debugging.

2. The Prior Arts

At present, the bandwidth demand driven by mobile applications, such as ultra-high-quality images 4K, 8K, virtual reality, 3D stereoscopic image display, etc., has greatly increased the traffic of mobile networks. In the current mobile communication technology development so far, the communication technology standard has gradually evolved from the 4G to 5G.

However, to implement the 5G technology, it is not only a simple upgrade of user equipment. In order to meet the bandwidth, latency, and service quality of the 5G technology, all devices from the front end to the back end of 5G technology need to be upgraded. In addition, to provide 5G services with highly complex technologies, the spectrum costs and network infrastructure upgrade costs are very high. After the launch of 5G technology, the number of 5G base stations deployed will be four times that of the past, and the cost of infrastructure equipment investment will be 10 to 20 times higher than the 4G technology.

Therefore, how to meet the low latency and service quality of the 5G technology while taking into account the cost considerations of upgrading the infrastructure is an important topic.

SUMMARY OF THE INVENTION

A primary objective of the present invention is to provide a multi-access edge computing architecture, wherein each module of the multi-access edge computing architecture can be detected by the baseboard management controller, which executes repeatedly a debugging step and a restoring step to always confirm whether each module of the multi-access edge computing architecture is in an error state, so that when the device fails, a mechanism is provided to actively detect and switch directly from the base station to the core network; when the device function is restored, the packet sent from the base station to the core network can be guided by a switching module to the original path of the multi-access edge computing architecture, achieving the purpose of seamless automatic debugging and automatic restoration.

To achieve the above objective, the present invention provides a multi-access edge computing architecture, which is deployed between a base station and a core network using the technology of a bump-in-the-wire (BITW) device, the multi-access edge computing architecture comprising: a baseboard management controller, used to detect each module of the multi-access edge computing architecture, and coupled to a network management system (NMS); a plurality of edge computing service modules, coupled to the baseboard management controller, used to integrate and provide a plurality of network services; a plurality of central processing unit (CPU) modules, coupled to the baseboard management controller, used to access and execute the plurality of network services; and a plurality of switching modules, coupled to the baseboard management controller, for directing packets sent from a base station to a core network to the multi-access edge computing architecture; wherein, when the power of the multi-access edge computing architecture is normal, the baseboard management controller repeats detection and controls each module of the multi-access edge computing architecture.

Preferably, according to the multi-access edge computing architecture of the present invention, at least one of the switching modules is a software-defined network switch, which is used to manage packet forwarding requirements, and the software-defined network switch performs the scheduling processing of the packets transmitted by the base station; the software-defined network switch determines the path selection and priority order of the packets according to the current resource occupancy. However, the present invention is not limited to this.

Preferably, according to the multi-access edge computing architecture of the present invention, the software-defined network switch further comprises a bypass switch, which is coupled to between the base station and the core networks, the bypass switch is used to process path selection and connection between the base station and the core network, but the invention is not limited to this.

Preferably, according to the multi-access edge computing architecture of the present invention, the multi-access edge computing architecture further comprises: an Internet, coupled to the core network; an application server, coupled to the software-defined network switch, wherein the application server is a regional server, but the present invention is not limited to this.

Preferably, according to the multi-access edge computing architecture of the present invention, one of the switching modules is a layer-3 switch, which is coupled to the edge computing service modules and the network management system. The layer-3 switch is used to convert, aggregate and manage packets, and convert the packets into one of public IP and private IP, but the present invention is not limited to this.

Preferably, according to the multi-access edge computing architecture of the present invention, the bypass switch and the layer-3 switch are used as backbone switches to connect the internal of the multi-access edge computing architecture.

Preferably, according to the multi-access edge computing architecture of the present invention, the switching modules are all switching modules based on OpenFlow network protocol.

Moreover, to achieve the aforementioned objective, the present invention further provides a detection method based on the aforementioned multi-access edge computing architecture, which comprises: a power source determination step: determining whether a power supply to a multi-access edge computing architecture is normal; if the power supply is not normal, switch to a core network by a bypass switch; if the power supply is normal, a baseboard management controller starts and executes a debugging step; wherein, the debugging step comprises: a debugging time setting step, setting a debugging time; a debugging time waiting step, waiting for the debugging time to complete; a debugging detection step, after waiting for the debugging time, the baseboard management controller detecting if one of the following conditions occurs: each of the plurality of CPU modules is in an error state, each of the plurality of edge computing service modules is in an error state, and each of the plurality of exchange modules is in an error state; if none of the above conditions of the debugging detection step occurs, repeat the debugging time setting step, the debugging time waiting step, and the debugging detection step; and if one of the above conditions in the debugging detection step occurs, the baseboard management controller notifies the network management system, and the baseboard management controller controls the bypass switch to switch to the core network.

Preferably, according to the detection method of the present invention, if one of the above conditions of the debugging detection step occurs, a restoration step is further performed, and the restoration step comprises: a restoration time setting step, setting a restoration time; a restoration time waiting step, waiting for the restoration time to complete; a restoration detection step, after waiting for the restoration time, the baseboard management controller detecting if all of the following conditions occurs: any of the CPU modules is in a correct state, any of the edge computing service modules is in a correct state, and any of the switching modules is in a correct state; if one of the above conditions in the restoration detection step is not true, repeat the restoration time setting step, the restoration time waiting step, and the restoration detection step; if the above conditions of the restoration detection step are all true, the network management system is notified by the baseboard management controller, and the baseboard management controller controls switching from the core network to a software-defined network switch, and repeats the debugging steps.

Preferably, according to the detection method of the present invention, in the debugging detection step, after waiting for the debugging time to complete, the baseboard management controller further first detects if each of the plurality of edge computing service modules is in an error state, then detects if each of the plurality of switching modules is in an error state, and finally, detects if each of the plurality of CPU modules is in an error state, but the present invention is not limited to this.

Preferably, according to the detection method of the present invention, in the restoration step, after waiting for the restoration time to complete, the baseboard management controller further first detects if each of the plurality of edge computing service modules is in an error state, then detects if each of the plurality of switching modules is in an error state, and finally, detects if each of the plurality of CPU modules is in an error state.

In summary, the multi-access edge computing architecture and related detection method provided by the present invention mainly rely on the baseboard management controller to repeatedly execute the debugging steps and restoration steps, and always confirm whether each module of the multi-access edge computing architectures is in an error state. As such, when the device fails, it will provide a mechanism to actively detect and switch from the base station to the core network directly. When the device function is restored, the packets sent by the base station can be directed by the switching modules through the original path to the core network in the multi-access edge computing architecture, achieving the purpose of seamless automatic debugging and automatic restoration.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
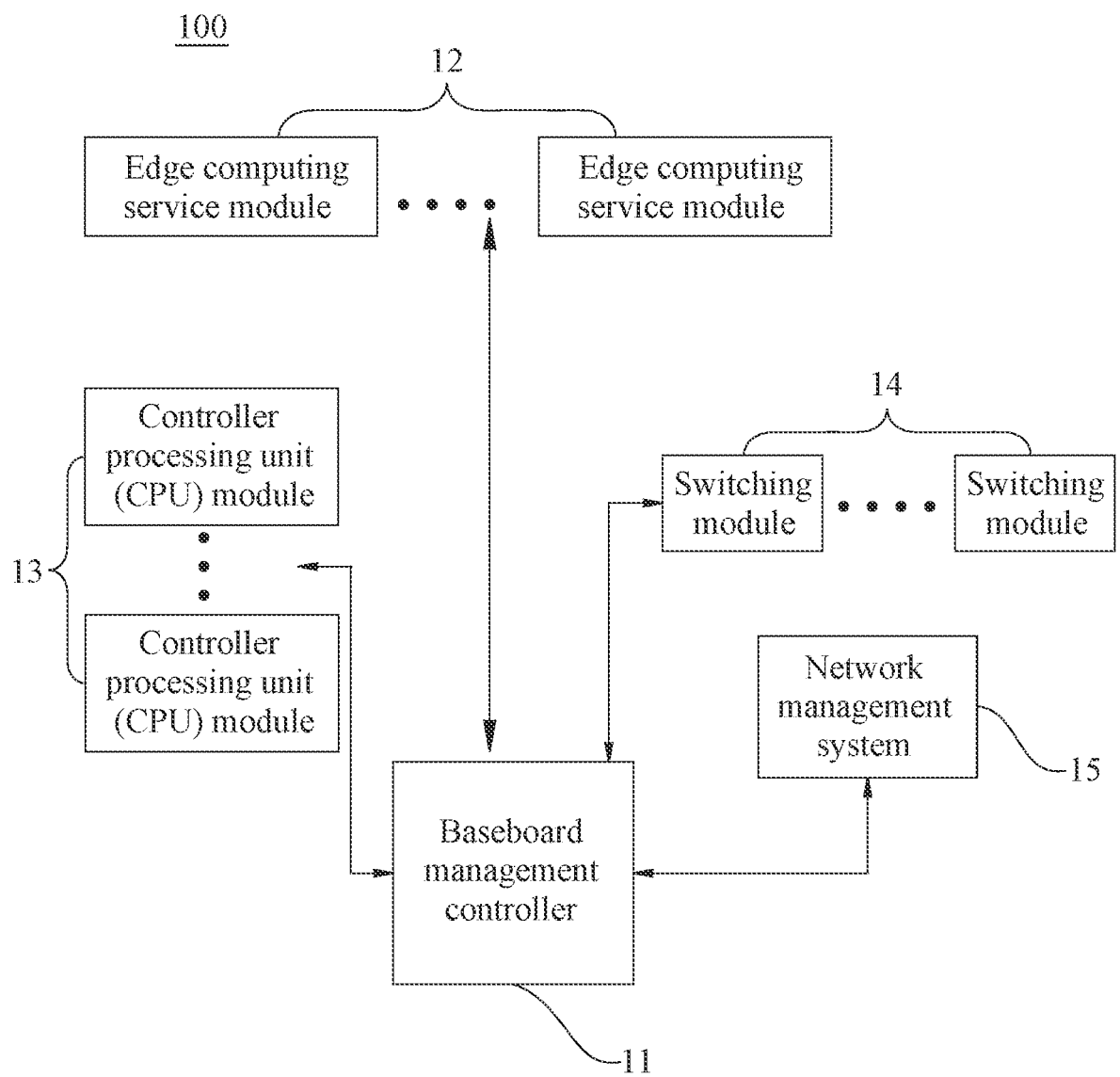
FIG. 1 is a schematic view illustrating a multi-access edge computing architecture according to the present invention.

Referring to FIG. 1, FIG. 1 is a schematic view of a multi-access edge computing architecture according to the present invention. As shown in FIG. 1, the multi-access edge computing architecture 100 of the present invention includes: a baseboard management controller 11, a plurality of edge computing service modules 12, a plurality of central processing unit (CPU) modules 13, a plurality of switching module 14, and a network management system 15.

Specifically, the multi-access edge computing architecture 100 of the present invention is deployed through the bump-in-the-wire (BITW) technology between the base station 16 and the core network 17. The BITW technology enables the multi-access edge computing architecture 100 to provide users and communication operators with higher integrity, confidentiality, and reliability in communication, while reducing the data transmission between the base station 16 and the core network 17 without the need for an additional independent bypass switch, thereby saving operating costs. As such, the multi-access edge computing architecture 100 of the present invention achieves the effects of low cost and wide applicability.

Specifically, referring to FIG. 1, the baseboard management controller 11 of the present invention is coupled to the edge computing service module 12, the central processing unit module 13, the switching module 14, and the network management system 15, and the baseboard management controller 11 is used to detect each module of the multi-access edge computing architecture 100. When the power of the multi-access edge computing architecture 100 is normal, the baseboard management controller 11 repeatedly performs debugging steps and the restoration step to confirm whether each module of the multi-access edge computing architecture is in an error state, and the state of each module is transmitted to the network management system 15.

Specifically, the edge computing service module 12 of the present invention is coupled to the baseboard management controller 11. The edge computing service module 12 is used to integrate and provide multiple network services, such as providing convenience and autonomy management functions, flexible diversion condition management, enterprise intranet custom management, etc.; however, the present invention is not limited to this.

Specifically, the central processing unit module 13 of the present invention is coupled to the baseboard management controller 11, and the central processing unit module 13 is used to access and execute the network services provided by the edge computing service module 12.

Specifically, the switching module 14 of the present invention is coupled to the baseboard management controller 11, and the switching module 14 directs the packets sent from the base station 16 to the core network 17 to the multi-access edge computing architecture 100. In addition, when the power of the multi-access edge computing architecture 100 is abnormal, the switching module 14 directly switches the packet transmitted by the base station 16 to the core network 17.

It is worth mentioning that the switching modules 14 of the present invention can include various switches with different functions according to user needs. In an embodiment of the present invention, one of the switching modules 14 is a bypass switch, which is usually used with inline devices, such as intrusion prevention systems (IPS), web application firewalls (WAF), or distributed denial-of-service attacks (DDoS), etc., The purpose of the bypass switch is to prevent network disconnection problems caused by system crashes and power outages. In addition, in a preferred embodiment of the present invention, one of the switching modules 14 is a customized software-defined network switch, which is used to manage packet forwarding requirements. The customized software-defined network switch performs the scheduling processing of the packets transmitted by the base station 16. The customized software-defined network switch determines the path selection and priority order of the packets according to the current resource consumption. In addition, the customized software-defined network switch includes a bypass switch. In the present invention, the term "abnormal power supply" covers aspects such as no power input, abnormal voltage, and abnormal current. In the present invention, when the power supply of the multi-access edge computing architecture 100 is abnormal, the bypass switch or the customized software-defined network switch is directly switched to the core network 17, and the speed at which the bypass switch is switched to the core network 17 can reach the nanosecond level, thereby achieving the effect of a seamless connection.

It is worth mentioning that the switching modules 14 according to the present invention can be, but not limited to, an OpenFlow Switch module of OpenFlow network protocol. In addition, according to the multi-access edge computing architecture 100 of the present invention, the switching modules 14 can be, but not limited to, a backbone switch connected to internal of the multi-access edge computing architecture 100.

Figure 2:
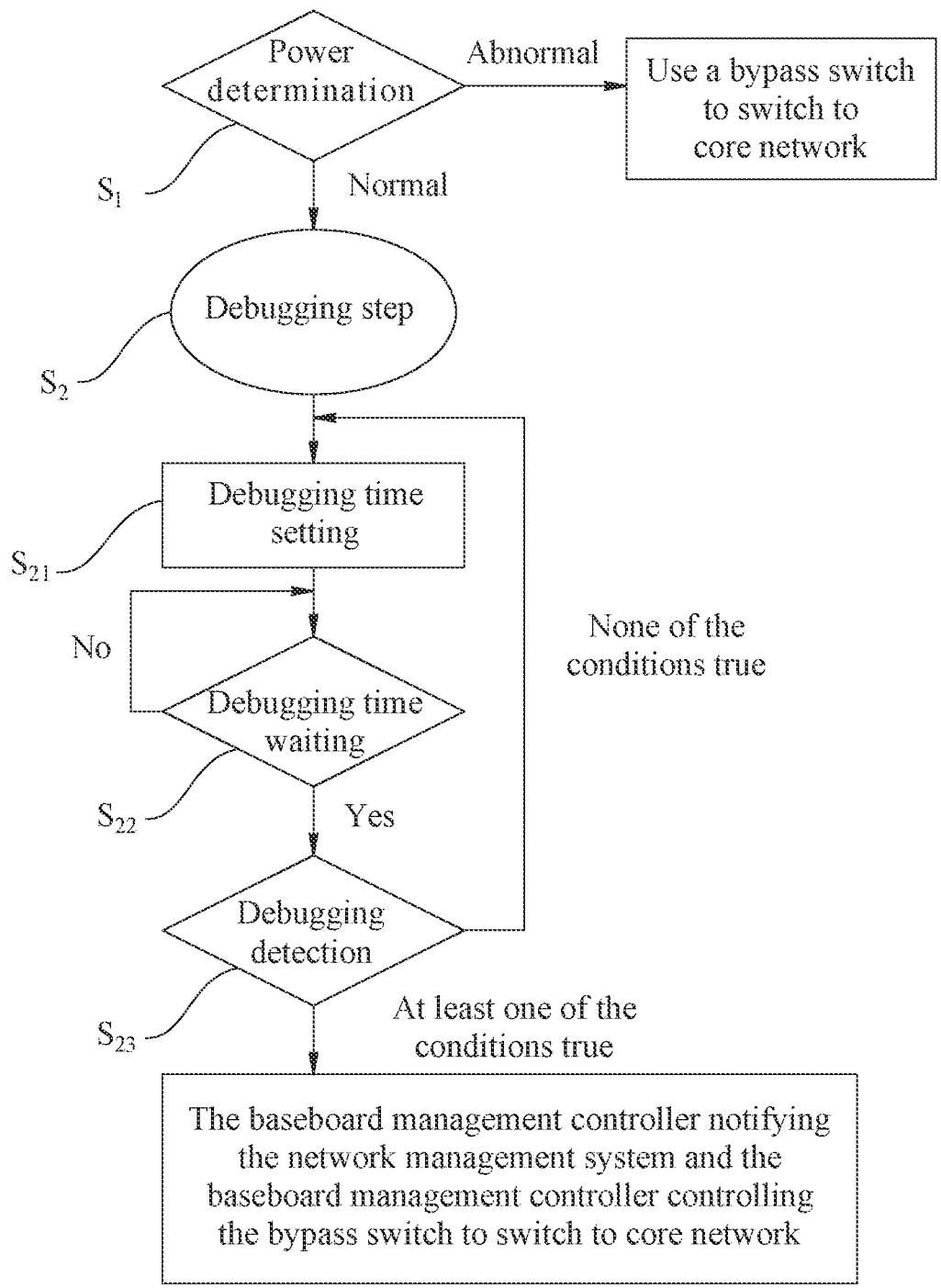
FIG. 2 is a flowchart illustrating the steps of the detection method of the present invention.

Refer to FIG. 2, which is a flowchart illustrating the steps of the detection method of the present invention. As shown in FIG. 2, the present invention further provides a detection method, applicable to the forementioned multi-access edge computing architecture 100. The detection method includes the following steps:

Power supply determination step $S_1$: determining whether the power supply of the multi-access edge computing architecture 100 is normal. If the power supply is abnormal, switch to the core network 17 through the bypass switch. If the power supply is normal, the baseboard management controller 11 starts and executes the debugging step $S_2$, wherein the debugging step $S_2$ includes the following steps.

Debugging time setting step $S_{21}$: setting a debugging time (not shown), and then executing the debug time waiting step $S_{22}$.

Debugging time waiting step $S_{22}$: waiting for the aforementioned debugging time to complete, and then performing debugging detection step $S_{23}$.

Debugging detection step $S_{23}$: after waiting for the debugging time to complete, the baseboard management controller 11 detecting whether one of the following conditions occurs: each of the CPU modules 13 is in an error state, each of the edge computing service modules 12 is in an error state, and each of the switching modules 14 is in an error state.

If none of the above conditions in the debugging detection step $S_{23}$ occurs, the baseboard management controller 11 repeats executing the debugging time setting step $S_{21}$, the debugging time waiting step $S_{22}$, and the debugging detection step $S_{23}$.

If one of the above states of the debugging detection step $S_{23}$ occurs, the network management system 15 is notified by the baseboard management controller 11, and the baseboard management controller 11 controls the bypass switch to switch to the core network 17.

As such, based on the multi-access edge computing architecture 100 of the present invention, combined with the detection method provided by the present invention, when the power supply of the multi-access edge computing architecture 100 fails, the bypass switch in the switching module 14 directly switches to the core network 17, and the speed at which the bypass switch switches to the core network 17 can reach the nanosecond level, thereby achieving the effect of a seamless connection. In addition, when the power of the multi-access edge computing architecture 100 is normal, the baseboard management controller 11 starts and executes the debugging step $S_2$ to actively detect each module of the multi-access edge computing architecture, and when an module-group error occurs (i.e., all modules of the same type are in an error state), the network management system 15 is notified by the baseboard management controller 11, and the baseboard management controller 11 controls the bypass switch to switch to the core network 17, so as to achieve the purpose of seamless and automatic debugging, but the present invention is not limited to this.

It should be further noted that the debugging time of the present invention may be manually set, or the debugging time may be the average of all the debugging times, but the present invention is not limited to this.

It is worth mentioning that, in a preferred embodiment of the present invention, according to the detection method of the present invention, if one of the above conditions of the debugging detection step occurs, a restoration step is further performed, and the restoration step includes:

Restoration time setting step: setting the restoration time, and then executing the restoration time waiting step.

Restoration time waiting step: waiting for the restoration time to complete, and then executing the restoration detection step.

The restoration detection step: after waiting for the restoration time to complete, the baseboard management controller 11 detects the following states: any one of the central processing unit modules 13 is in a correct state, any one of the edge computing service modules 12 is in a correct state and any one of the switching modules 14 is in a correct state.

If one of the above conditions of the restoration detection step is not true, repeat the restoration time setting step, the restoration time waiting step, and the restoration detection step.

If the above states of the restoration detection step are all true, the baseboard management controller 11 informs the network management system 15 and the baseboard management controller 11 controls to switch from the core network 17 to the software-defined network switch, and repeat the debugging step $S_2$.

As such, the multi-access edge computing architecture 100 and related detection method provided by the present invention mainly rely on the baseboard management controller 11 to repeatedly execute the debugging step $S_2$ and the restoration step, and always confirm whether each module of the multi-access edge computing architecture 100 is in an error state, so that when the device fails, it will provide a mechanism to actively detect and switch from the base station 16 to the core network 17 directly. When the device function is restored, the switching modules 14 direct the packets sent from the base station 16 to the core network 17 to the original path of the multi-access edge computing architecture 100 to achieve seamless automatic debugging and automatic restoration.

First Embodiment

Hereinafter, with reference to the drawings, the first embodiment of the multi-access edge computing architecture 100 of the present invention will be described.

Figure 3:
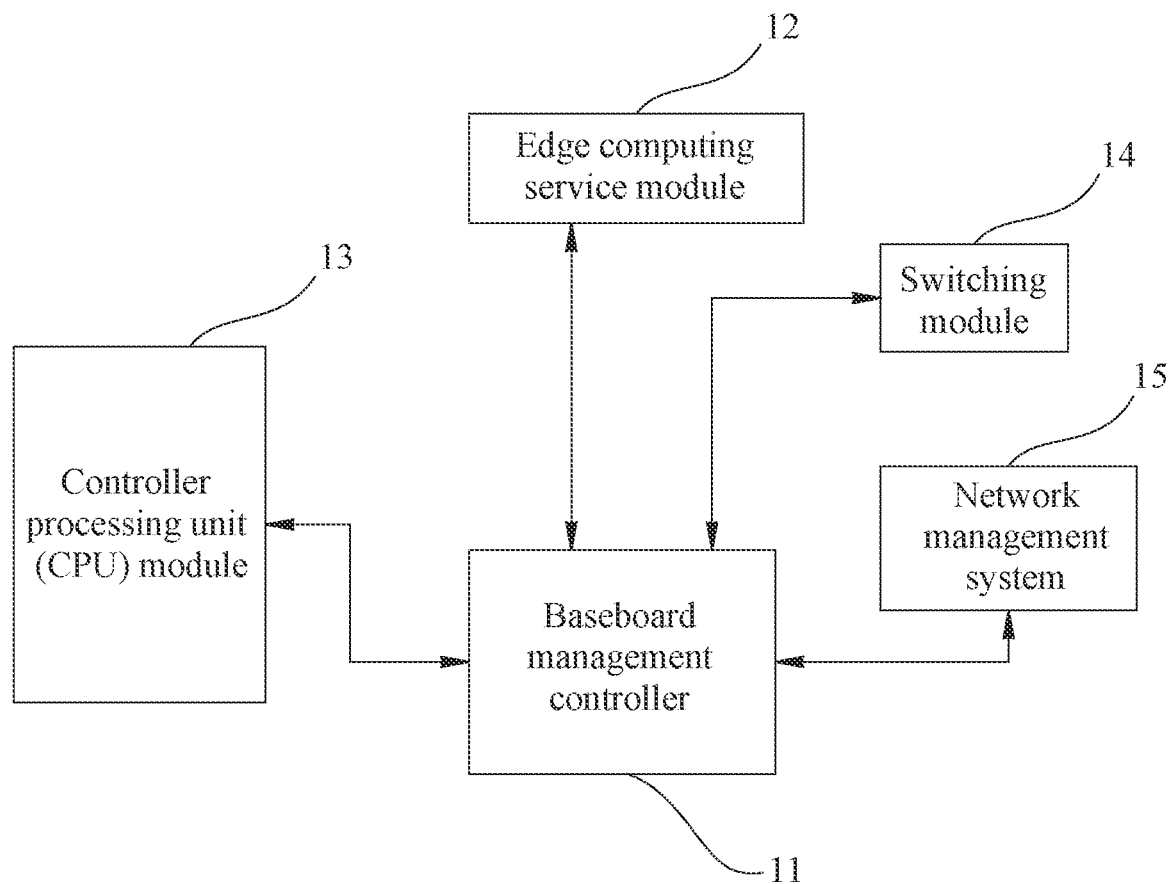
FIG. 3 is a schematic view of a multi-access edge computing architecture according to the first embodiment of the present invention.

Refer to FIG. 3, which is a schematic view of a multi-access edge computing architecture according to the first embodiment of the present invention. As shown in FIG. 3, the multi-access edge computing architecture 100 of the present invention includes: a baseboard management controller 11, an edge computing service module 12, a central processing unit module 13, a switching module 14, and a network management system 15.

Specifically, the multi-access edge computing architecture 100 according to the first embodiment of the present invention uses the technology of bump-in-the-wire (BITW) for deployment between the base station 16 and the core network 17. Meanwhile, with the BITW technology, the multi-access edge computing architecture 100 of the present invention can provide users and communication operators with higher integrity, confidentiality, or reliability in communication, and at the same time reduce the data transmission between the base station 16 and the core network 17 without requiring an additional independent bypass switch, thereby saving operating costs. As such, the multi-access edge computing architecture 100 according to the present invention achieves the effects of low cost and wide applicability.

Specifically, the baseboard management controller 11 according to the first embodiment of the present invention is coupled to the edge computing service module 12, the central processing unit module 13, the switching module 14, and the network management system 15. The baseboard management controller 11 is used to detect each module of the multi-access edge computing architecture 100. When the power supplied to the multi-access edge computing architecture 100 is normal, the baseboard management controller 11 repeatedly executes the debugging steps and the restoration steps to confirm whether each module of the multi-access edge computing architecture is in an error state, and the state of each module is transmitted to the network management system 15.

Specifically, the edge computing service module 12 according to the first embodiment of the present invention is coupled to the baseboard management controller 11. The edge computing service module 12 is used to integrate and provide multiple network services, such as, convenience and autonomy management functions, flexible diversion condition management, enterprise intranet custom management, etc.; however, the present invention is not limited to this.

Specifically, the central processing unit module 13 according to the first embodiment of the present invention is coupled to the baseboard management controller 11, and the central processing unit module 13 is used to access and execute the network services provided by the edge computing service module 12.

Specifically, the switching module 14 according to the first embodiment of the present invention is coupled to the baseboard management controller 11, and the switching module 14 directs the packets transmitted from the base station 16 to the core network 17 to the multi-connector edge computing architecture 100. In addition, when the power of the multi-access edge computing architecture 100 is abnormal, the switching module 14 directly switches the packet transmitted by the base station 16 to the core network 17.

Figure 4:
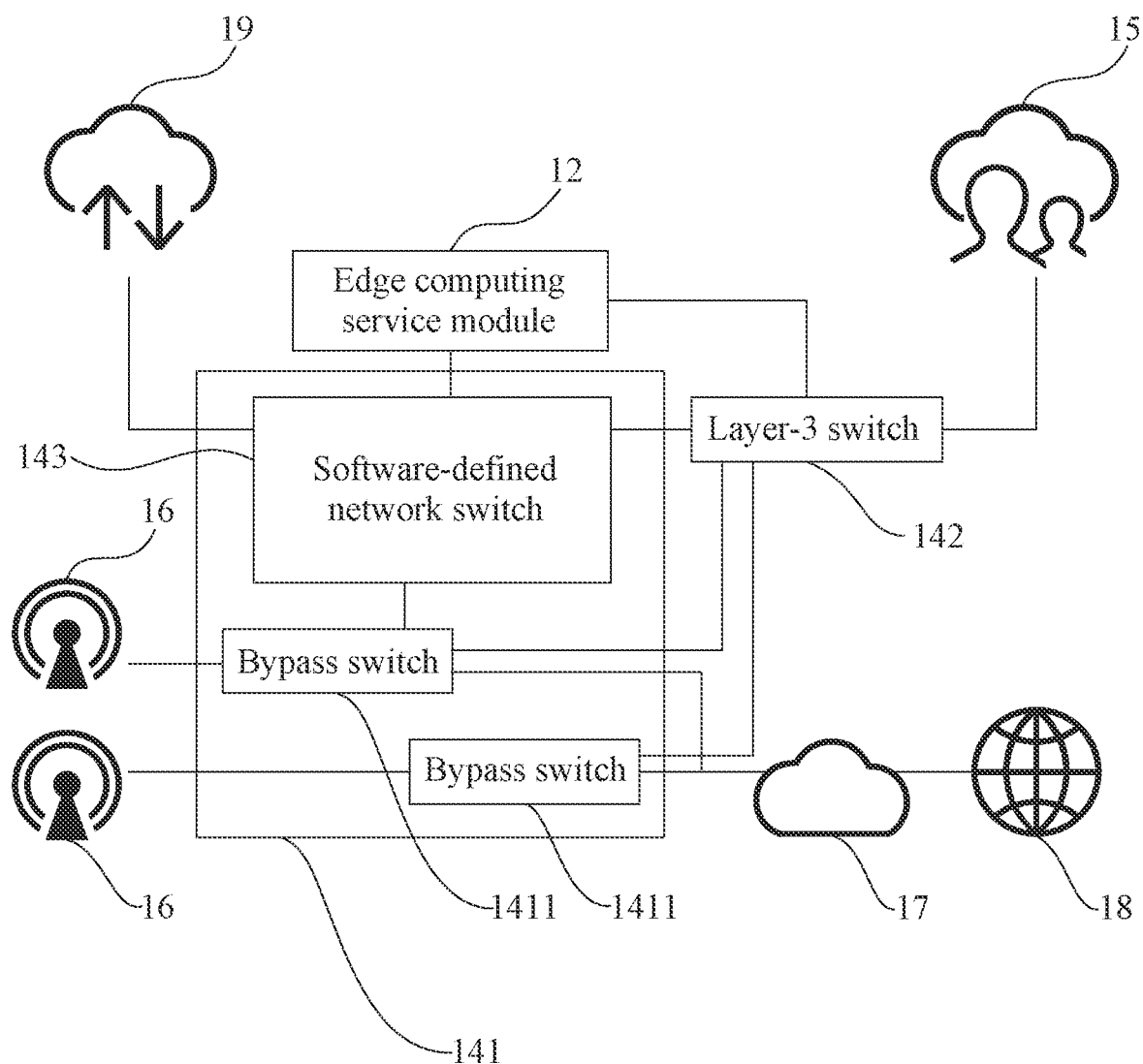
FIG. 4 is a schematic view of the structure of the multi-access edge computing architecture according to the first embodiment of the present invention.

Referring to FIG. 4, FIG. 4 is a schematic view of the structure of the multi-access edge computing architecture according to the first embodiment of the present invention. As shown in FIG. 4, the switching module 14 according to the first embodiment of the present invention can include various switches with different functions according to user needs. In the present embodiment, the switching modules 14 include: a customized software-defined network switch 141, a software-defined network switch 143, and a third-layer switch 142.

Specifically, the customized software-defined network switch 141 of the first embodiment of the present invention is used to manage packet forwarding requirements, and the customized software-defined network switch 141 performs the scheduling process of packets transmitted by the base station 16. The customized software-defined network switch 141 determines the path selection and priority order of the packets according to the current resource usage, but the present invention is not limited to this. It is worth mentioning that the customized software-defined network switch 141 according to the first embodiment of the present invention can be, but is not limited to, a switch that includes various functions according to the needs of the user.

Specifically, the layer-3 switch 142 of the first embodiment of the present invention is coupled to the edge computing service module 12 and the network management system 15, the layer-3 switch 142 is used for conversion And collect and manage packets, and convert the packets into one of public IP and private IP, but the present invention is not limited to this.

Specifically, referring to FIG. 4, the multi-access edge computing architecture 100 according to the first embodiment of the present invention further includes: an Internet 18 and an application server 19, wherein the Internet 18 is coupled to the core network 17, the application server 19 is coupled to the customized software-defined network switch 141, the application server 19 is a regional server, and the application server 19 may further include the mobile management application (APP) based on the multi-access edge computing architecture 100 of the present invention. The mobile management application is easy to carry and, widely used and more convenient. It can monitor and the packet information of the multi-access edge computing architecture 100 and issue commands without using a computer, but the present invention is not limited to this.

Figure 5:
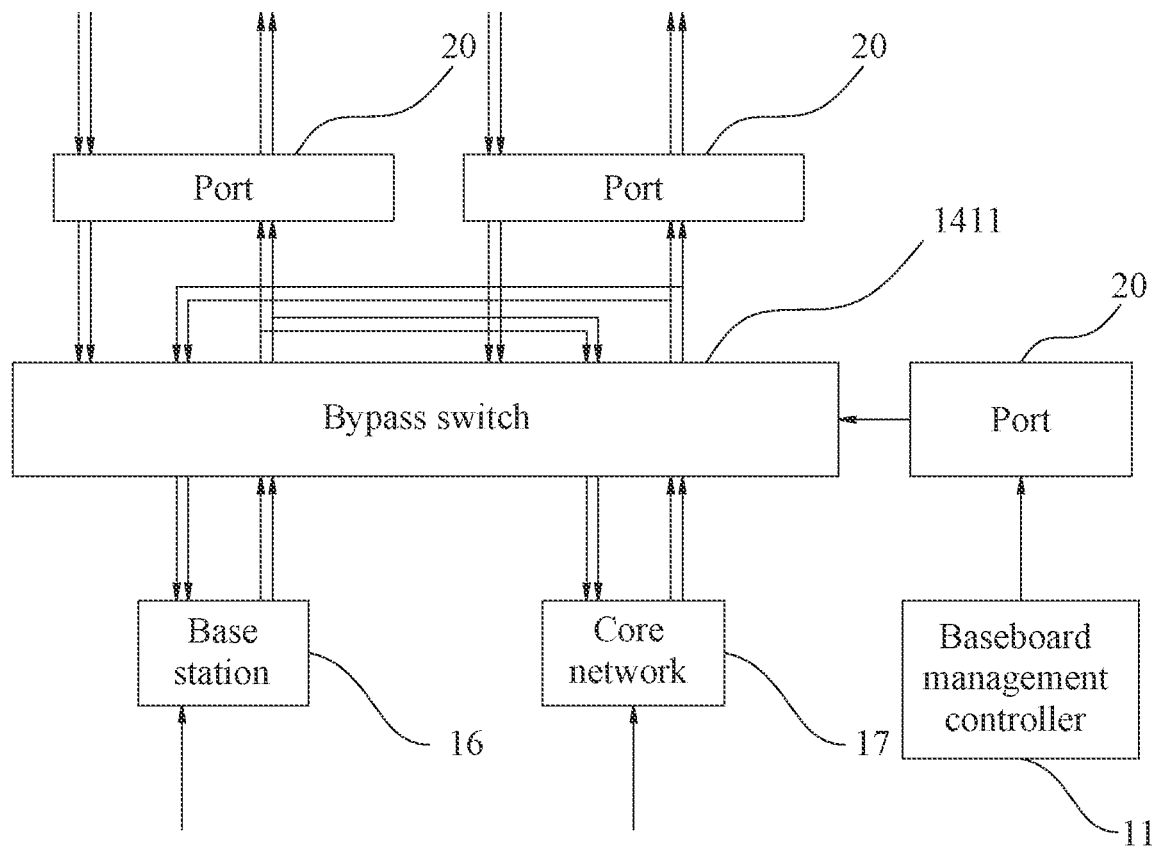
FIG. 5 is a schematic view of a bypass switch according to the first embodiment of the present invention.

Specifically, refer to FIG. 5, which is a schematic view of the bypass switch according to the first embodiment of the present invention. The customized software-defined network switch 141 according to the first embodiment of the present invention further includes a bypass switch 1411. The bypass switch 1411 is coupled between the base station 16 and the core network 17. The path switch 1411 is coupled to the baseboard management controller 11, and the bypass switch 1411 has a plurality of ports 20 connected to the edge computing service module 12. The bypass switch 1411 is used to process the path selection and connection of the packets between the base station 16 and the core network 17. In the present embodiment, when the power of the multi-access edge computing architecture 100 is normal, the bypass switch 1411 directs the packets originally sent from the base station 16 to the core network 17 to the multi-access edge computing architecture 100, and when the power supply of the multi-access edge computing architecture 100 is abnormal, the packet transmitted by the base station 16 is directly switched to the core network 17 by the bypass switch 1411. In addition, when the power of the multi-access edge computing architecture 100 is normal, the bypass switch 1411 directs the packets originally sent from the core network 17 to the base station 16 to the multi-access edge computing architecture 100, and when the power supply of the multi-access edge computing architecture 100 is abnormal, the packet transmitted by the core network 17 is directly switched to the base station 16 by the bypass switch 1411. Wherein, the speed at which the bypass switch 1411 switches packets to the base station 16 or the core network 17 can reach the nanosecond level, thereby achieving the effect of a seamless connection.

Figure 6A:
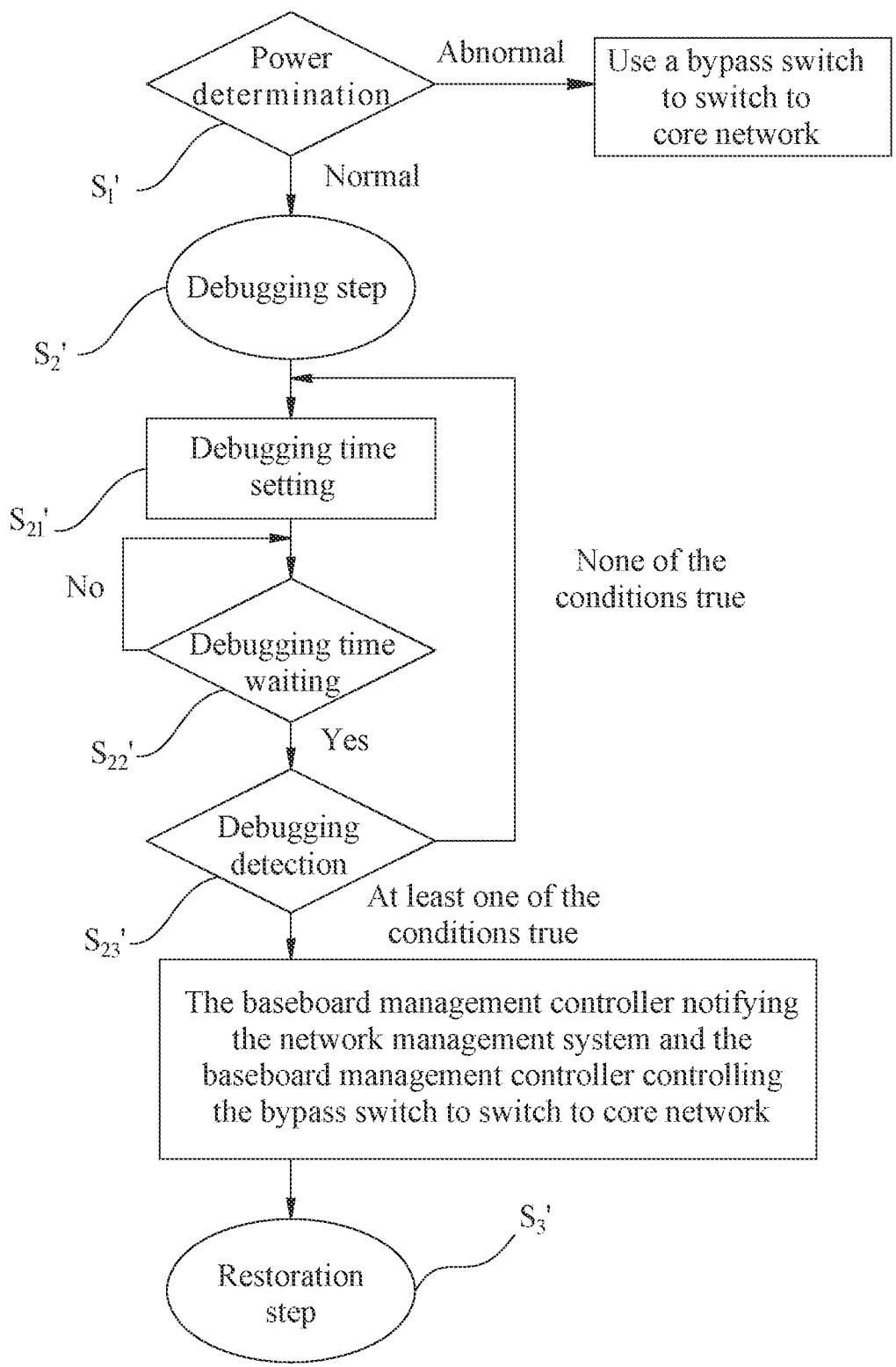
FIG. 6A is a flowchart illustrating the steps of the detection method of the first embodiment of the present invention.

Referring to FIG. 6A, FIG. 6A is a flowchart illustrating the steps of performing the detection method of the first embodiment of the present invention. As shown in FIG. 6A, the present invention further provides a detection method, which is applicable to the multi-access edge computing architecture 100 of the first embodiment. The detection method includes the following steps:

Power supply determination step $S_1'$: determining whether the power supply of the multi-access edge computing architecture 100 is normal. If the power supply is abnormal, the bypass switch 1411 is used to switch to the core network 17. If the power supply is normal, the baseboard management controller 11 is activated and executes the debugging step $S_2'$, and the debugging step $S_2'$ includes the following steps:

Debugging time setting step $S_{21}'$: setting a debugging time, and then executing the debugging time waiting step $S_{22}'$.

Debugging time waiting step $S_{22}'$: waiting for the debugging time to complete, and then executing the debugging detection step $S_{23}'$.

Debugging detection step $S_{23}'$, after waiting for the debugging time to complete, the baseboard management controller 11 detects whether the following conditions occur: each of the CPU modules 13 is in an error state, each of the edge computing service modules 12 is in an error state, and each of the switching modules 14 is in an error state.

If none of the above conditions of the debug detection step $S_{23}'$ occurs, the baseboard management controller 11 repeats executing the debug time setting step $S_{21}'$, the debug time waiting step $S_{22}'$, and the debugging detection step $S_{23}'$.

If one of the above conditions in the debugging detection step $S_{23}'$ occurs, the network management system 15 is notified by the baseboard management controller 11, and the baseboard management controller 11 controls the bypass switch 1411 to switch to the core network 17 and then further executes the restoration step $S_3'$.

Figure 6B:
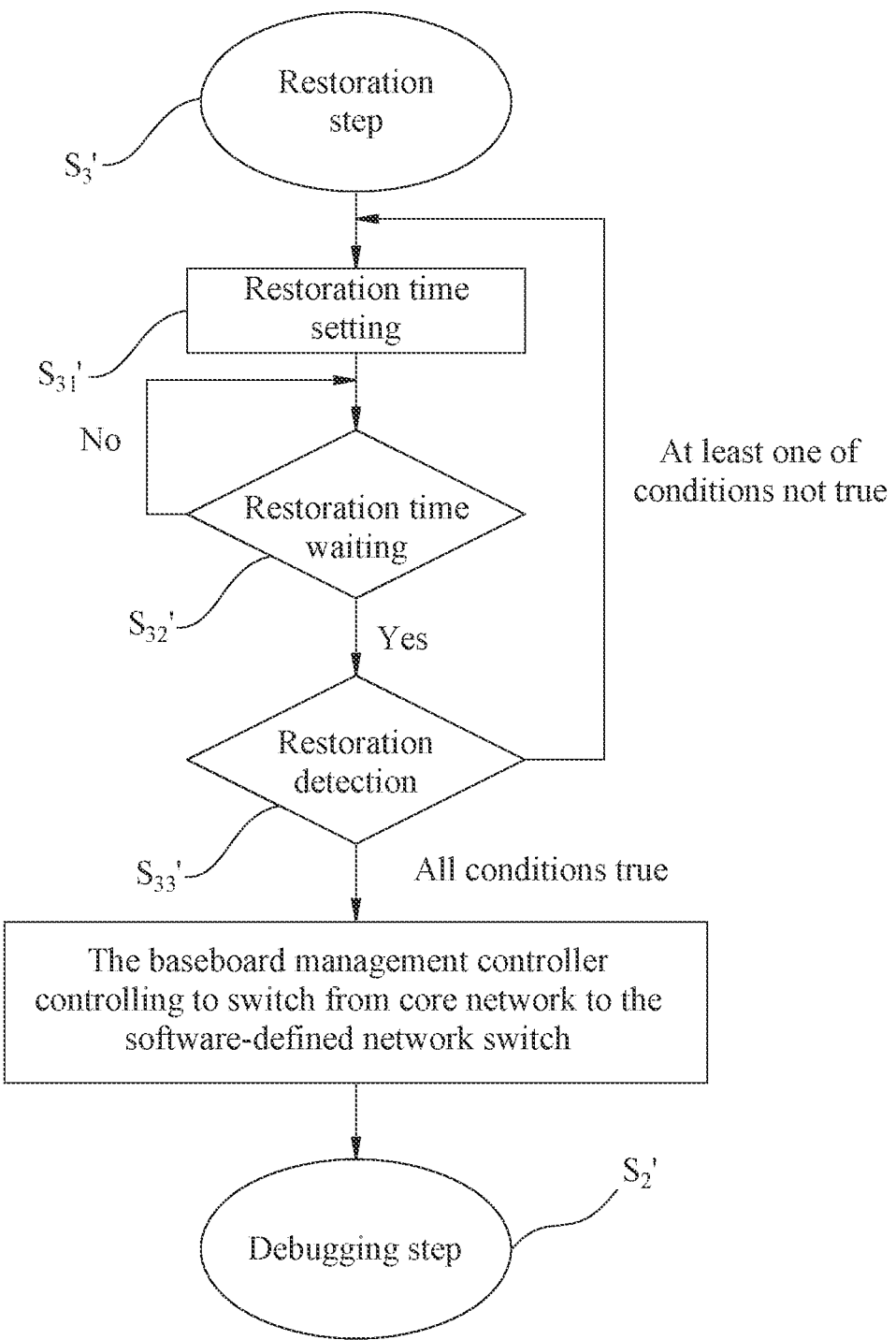
FIG. 6B is another flowchart illustrating the restoration step of the detection method of the first embodiment of the present invention.

Refer to FIG. 6B, FIG. 6B is a flowchart illustrating the restoration step of the detection method of the first embodiment of the present invention. As shown in FIG. 6B, the restoration step $S_3'$ includes:

Restoration time setting step $S_{31}'$: setting the restoration time, and then execute the restoration time waiting step $S_{32}'$.

Restoration time waiting step $S_{32}'$: waiting for the restoration time to complete, and then executing restoration detection step $S_{33}'$.

Restoration detection step $S_{33}'$: after waiting for the restoration time, the baseboard management controller 11 detecting whether the following conditions occur: any one of the central processing unit modules 13 is in the correct state, any one of the edge computing service modules 12 is in the correct state, and any one of the switching modules 14 is in the correct state.

If one of the above conditions in the restoration detection step $S_{33}'$ is not true, the baseboard management controller 11 repeats executing the restoration time setting step $S_{31}'$, the restoration time waiting step $S_{32}'$, and the restoration detection step $S_{33}'$.

If the above conditions of the restoration detection step $S_{33}'$ are all true, the baseboard management controller 11 informs the network management system 15 and the baseboard management controller 11 controls to switch from the core network 17 to the customized software-defined network, and then repeats the debugging step $S_2'$.

As such, the multi-access edge computing architecture 100 and related detection method of the first embodiment of the present invention mainly rely on the baseboard management controller 11 to repeatedly execute the debugging step $S_2'$ and the restoring step $S_3'$ to confirm whether each module in the multi-access edge computing architecture 100 is in an error state, so that when the device fails, it will provide a mechanism to actively detect and switch from the base station 16 to the core network 17 directly; when the device function is restored, the packet sent from the base station 16 to the core network 17 by the switching module 14 is directed to the original path of the multi-access edge computing architecture 100 to achieve seamless automatic debugging and automatic restoration.

It is worth noting that, according to the detection method of the first embodiment of the present invention, in the debugging detection step $S_{23}'$, after waiting for the debugging time to complete, the baseboard management controller 11 first detects whether each of the edge computing service modules 12 is in an error state, then detects whether each of the switching modules 14 is in an error state, and finally detects whether each of the CPU modules 13 is in an error state. As a result, since the baseboard management controller 11 detects each of the edge computing service modules 12 at a faster detection speed, therefore when the extreme response time of the multi-access edge computing architecture 100 is required, the baseboard management controller 11 first detects each of the edge computing service modules 12 to further improve the applicability and detection speed of the detection method of the present invention, but the present invention is not limited to this.

It is worth noting that, according to the detection method of the first embodiment of the present invention, in the restoration detection step $S_{33}'$, after waiting for the restoration time to complete, the baseboard management controller 11 first detects whether any one of the edge computing service modules 12 is in a correct state, then detects whether any one of the switching modules 14 is in a correct state, and finally detects whether any one of the CPU modules 13 is in a correct state. As a result, since the baseboard management controller 11 detects each of the edge computing service modules 12 at a faster detection speed, therefore when the extreme response time of the multi-access edge computing architecture 100 is required, the baseboard management controller 11 first detects the edge computing service modules 12 to further improve the applicability and detection speed of the detection method of the present invention, but the present invention is not limited to this.

Finally, the technical features of the present invention and achievable technical effects are summarized as follows:

First, based on the multi-access edge computing architecture 100 of the present invention, combined with the detection method provided by the present invention, while successfully satisfying the low latency and service quality of 5G technology and taking into account the cost considerations of upgrading the infrastructure, provides a multi-access edge computing architecture 100 with high stability and low latency.

Second, according to the multi-access edge computing architecture 100 of the present invention, the baseboard management controller 11 can repeatedly execute the debugging step $S_2$ and the restoration step, and always confirm whether each module group of the multi-access edge computing architecture 100 is in an error state, so that when the device fails, it will provide a mechanism to actively detect and switch from the base station 16 to the core network 17 directly. When the device function is restored, the packets from base station 16 transmitted through the switching module to the core network 17 are directed to the original path of the multi-access edge computing architecture 100 to achieve seamless automatic debugging and automatic restoration.

Third, the detection method of the present invention is performed in the debugging detection step $S_{23}$ and the restoration detection step $S_{33}'$. The baseboard management controller 11 first detects the edge computing service module 12, which further improves the applicability and detection speed of the detection method of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A multi-access edge computing architecture, deployed between a base station and a core network using bump-in-the-wire (BITW) technology, comprising:
   a baseboard management controller, used to detect each module of the multi-access edge computing architecture, and coupled to a network management system (NMS);
   a plurality of edge computing service modules, coupled to the baseboard management controller, used to integrate and provide a plurality of network services;
   a plurality of central processing unit (CPU) modules, coupled to the baseboard management controller, used to access and execute the plurality of network services; and
   a plurality of switching modules, coupled to the baseboard management controller, for directing packets sent from a base station to a core network to the multi-access edge computing architecture;
   wherein, when the power of the multi-access edge computing architecture is normal, the baseboard management controller repeats detection and controls each module of the multi-access edge computing architecture;
   at least one of the switching modules is a software-defined network switch, which is used to manage packet forwarding requirements, and the software-defined network switch performs the scheduling processing of the packets transmitted by the base station; the software-defined network switch determines the path selection and priority order of the packets according to the current resource occupancy.

2. The multi-access edge computing architecture according to claim 1, wherein the software-defined network switch further comprises a bypass switch, which is coupled to between the base station and the core networks, the bypass switch is used to process path selection and connection between the base station and the core network.

3. The multi-access edge computing architecture according to claim 2, wherein the multi-access edge computing architecture further comprises:
   an Internet, coupled to the core network; and
   an application server, coupled to the software-defined network switch, wherein the application server is a regional server.

4. The multi-access edge computing architecture according to claim 3, wherein one of the switching modules is a layer-3 switch, which is coupled to the edge computing service modules and the network management system, the layer-3 switch is used to convert, aggregate and manage packets, and convert the packets into one of public IP and private IP.

5. The multi-access edge computing architecture according to claim 4, wherein the bypass switch and the layer-3 switch are used as backbone switches to connect the internal of the multi-access edge computing architecture.

6. The multi-access edge computing architecture according to claim 1, wherein the switching modules are all switching modules based on OpenFlow network protocol.

7. A detection method, applicable to the multi-access edge computing architecture in claim 1, comprising the steps of:
   power source determination step: determining whether a power supply to a multi-access edge computing architecture is normal; if the power supply is not normal, switch to a core network by a bypass switch; if the power supply is normal, a baseboard management controller starts and executes a debugging step; wherein, the debugging step comprises:
   debugging time setting step: setting a debugging time;
   debugging time waiting step: waiting for the debugging time to complete;
   debugging detection step: after waiting for the debugging time, the baseboard management controller detecting if one of the following conditions occurs: each of the plurality of CPU modules is in an error state, each of the plurality of edge computing service modules is in an error state, and each of the plurality of exchange modules is in an error state;

if none of the above conditions of the debugging detection step occurs, repeat the debugging time setting step, the debugging time waiting step, and the debugging detection step; and if one of the above conditions in the debugging detection step occurs, the baseboard management controller notifies the network management system, and the baseboard management controller controls the bypass switch to switch to the core network.

8. The detection method according to claim 7, wherein if one of the above conditions of the debugging detection step occurs, a restoration step is further performed, and the restoration step comprises:

restoration time setting step: setting a restoration time;

restoration time waiting step: waiting for the restoration time to complete;

restoration detection step: after waiting for the restoration time, the baseboard management controller detecting if all of the following conditions occurs: any of the CPU modules is in a correct state, any of the edge computing service modules is in a correct state, and any of the switching modules is in a correct state;

if one of the above conditions in the restoration detection step is not true, repeat the restoration time setting step, the restoration time waiting step, and the restoration detection step;

if the above conditions of the restoration detection step are all true, the network management system is notified by the baseboard management controller, and the baseboard management controller controls switching from the core network to a software-defined network switch, and repeats the debugging steps.

9. The detection method according to claim 8, wherein in the restoration step, after waiting for the restoration time to complete, the baseboard management controller further first detects if each of the plurality of edge computing service modules is in an error state, then detects if each of the plurality of switching modules is in an error state, and finally, detects if each of the plurality of CPU modules is in an error state.

10. The detection method according to claim 7, wherein in the debugging detection step, after waiting for the debugging time to complete, the baseboard management controller further first detects if each of the plurality of edge computing service modules is in an error state, then detects if each of the plurality of switching modules is in an error state, and finally, detects if each of the plurality of CPU modules is in an error state.

* * * * *